United States Patent [19]

Riemscheid

[11] 4,403,781
[45] Sep. 13, 1983

[54] SEALING ASSEMBLY FOR UNIVERSAL JOINT

[75] Inventor: Helmut Riemscheid, Lohmar, Fed. Rep. of Germany

[73] Assignee: Uni-Cardan Aktiengesellschaft, Siegburg, Fed. Rep. of Germany

[21] Appl. No.: 304,622

[22] Filed: Sep. 22, 1981

[30] Foreign Application Priority Data

Sep. 24, 1980 [DE] Fed. Rep. of Germany ....... 3035884

[51] Int. Cl.³ .......................... F16D 3/84; B61F 15/22
[52] U.S. Cl. .............................. 277/212 FB; 277/30; 277/88; 464/175
[58] Field of Search .................. 277/212 FB, 88, 30, 277/208, 175; 464/173, 906, 175; 74/18, 18.1, 18.2; 403/50, 51

[56] References Cited

U.S. PATENT DOCUMENTS

| | | | |
|---|---|---|---|
| 1,167,695 | 1/1916 | Huff | 403/51 |
| 1,175,880 | 3/1916 | Cookingham et al. | 464/175 |
| 2,432,803 | 12/1947 | Rice | 464/175 |
| 3,830,083 | 8/1974 | Hadick et al. | 277/212 FB |
| 3,928,985 | 12/1975 | Girguis | 464/906 |
| 4,224,808 | 9/1980 | Gehrke | 277/208 |

FOREIGN PATENT DOCUMENTS

| | | | |
|---|---|---|---|
| 247006 | 2/1961 | Australia | 277/212 FB |
| 826440 | 1/1960 | United Kingdom | 277/212 FB |

Primary Examiner—Stuart S. Levy
Assistant Examiner—Lloyd D. Doigan
Attorney, Agent, or Firm—Toren, McGeady and Stanger

[57] ABSTRACT

A sealing assembly including a resilient boot or sleeve mounted in sealing engagement between the inner and outer members of a universal joint with one end of the sleeve being connected to an axially moveable bush mounted about the drive shaft of the universal joint. An annular groove is formed on the drive shaft and an annular sealing ring arranged within the groove is interposed between the drive shaft and the axially moveable bush.

3 Claims, 1 Drawing Figure

U.S. Patent Sep. 13, 1983 4,403,781
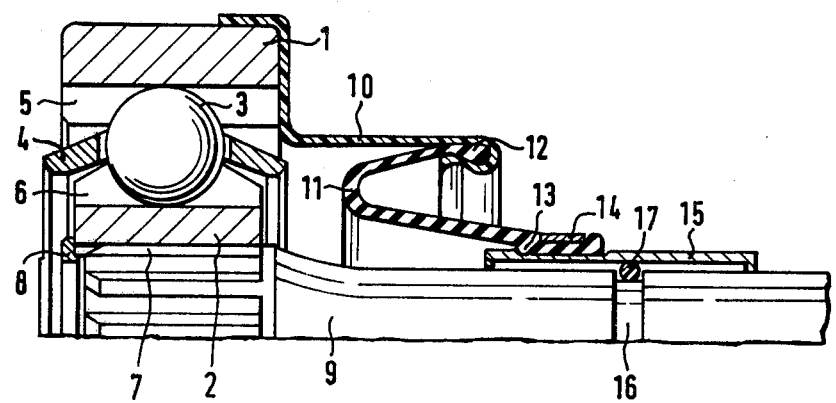

SEALING ASSEMBLY FOR UNIVERSAL JOINT

The present invention relates generally to a sealing assembly operating to provide a seal between the driving and driven members of a CV rotary universal joint having rolling members interposed between the inner and outer member of the joint for transmitting torque therebetween. The joint of the type to which the present invention relates includes grooves formed in the inner and outer members of the joint within which the rolling members are received and wherein they are taken to half the angle of articulation, with one end of a sleeve of the sealing assembly being held by the driven part of the universal joint.

With a design of the type to which the present invention relates, the sealing sleeve bridges the entire space between the driving part, e.g. the inner joint member, and the driven part, e.g. the outer joint member. Thus, the sleeve is subjected to the entire range of relative movement between the joint parts.

Sealing sleeves for universal joints of the type to which the present invention relates are known from German Pat. No. 22 05 798 wherein for purposes of mounting the sleeve further fixing elements are provided at the cage of the joint. In such a device, a division is achieved between the space to be bridged by the sleeve, i.e. an accurate division of the angle of articulation and also of the plunging distance. As the cage is arranged inside the outer joint member, an intermediate fixing arrangement at the cage results in two parts which extend assymetrically relative to each other and which are subject to different loads and requirements during operation so that a choice presents itself for producing the respective sleeve parts from different materials.

A further disadvantage is that the cage not only does not have control functions relative to the joint but also holding functions with reference to fixing of the sleeve.

It is therefore an object of the invention to provide a sealing arrangement which reduces the load on the sleeve by dividing the angle of articulation and the plunging distance while utilizing standard, economically priced components.

SUMMARY OF THE INVENTION

Briefly, the present invention may be described as a sealing assembly for a universal joint which includes an inner joint member, an outer joint member, torque transmission means interposed between the inner and outer joint members, said torque transmission means including rolling bodies received in grooves of the inner and outer joint members and a drive shaft connected in driving engagement with one of the inner and outer joint members. The sealing arrangement comprises a sleeve having a first end and a second end, with the first end of the sleeve being connected to the other of said inner and outer joint members, an annular groove formed in the drive shaft, a bush arranged concentrically with the drive shaft, a sealing ring arranged within the annular groove between the bush and the drive shaft mounting the bush to be axially moveable relative to the drive shaft, with the sealing ring operating as a contact seal relative to the inner diameter of the bush and with attachment means provided for affixing the second end of the sleeve to the outer circumference of the bush.

An advantage of the structure of the present invention is that the axially movable bush serves as a fixing contact for the sleeve and is slideably arranged on the drive shaft together with the sealing ring. In the case of a plunging joint, such a bush performs the task of accommodating the sliding distance of the joint by remaining in place while the shaft effects its movement, i.e. moves into the bush, so that the sleeve need only carry out the function of articulation. The bush itself may be of plastic, metal or of similar material.

In order to insure that the sleeve is properly fixed to the bush, a further feature of the invention provides for the outer face of the bush to be formed with an annular recess into which the second end of the sleeve, which is formed as a collar, engages.

In accordance with a further feature of the invention, the sleeve is designed as a bellows or boot having folds axially extending side by side in the radial direction. Alternatively, the sleeve may be formed as a rolling boot with one single fold extending in an axial direction.

The advantage of a design of this type is that, depending upon the practical requirements involved, a suitable sleeve may be selected which will insure the respective functions required.

In order to insure indirect fixing of the sleeve to the outer joint member of the universal joint, a further embodiment of the invention includes an additional holding device if a rolling boot is used, with such a holding device operating to connect the first end of the rolling boot to the driven part of the universal joint.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWING

The drawing comprises a single FIGURE which is a sectional view taken through a universal joint illustrating a sealing assembly in accordance with the present invention.

DETAILED DESCRIPTION OF THE PREFERRED EMBODIMENT

Referring now to the drawing, the sealing assembly of the present invention is shown as embodied together with a universal joint which consists of an outer joint member 1, an inner joint member 2 with a cage 4 interposed therebetween holding in operative position torque transmission members in the form of balls 3.

The outer joint member 1 and the inner joint member 2 are formed with grooves 5 and 6 which receive therein the balls 3. The cage 4 has a spherical outer face and is received in the space within the outer joint member 1. The inner joint member 2 is connected to a drive shaft 9 by means of a spline connection 7 and by a securing ring 8.

The sealing assembly of the invention is principally comprised of a sleeve or boot member 11 which is interposed in sealing engagement between the outer joint member 1 and the drive shaft 9 connected to the inner joint member 2. The sleeve 11 may be made of rubber or of a resilient elastomeric material. The sleeve 11 includes a first end composed of a collar 12 and a second end composed of a collar 13. Intermediate the collars 12 and 13, the sleeve forms an axially directed fold with sides thereof extending generally in the axial direction.

The drive shaft 9 is formed with an annular groove 16 within which there is received a sealing ring 17. Extending concentrically with the drive shaft 9 about the outer circumference thereof is a bush 15 which may be made of plastic or of metal material, the bush 15 being mounted by means of the sealing ring 17 for axial movement relative to the drive shaft 9.

The collar 13 formed at the second end of the boot or sleeve 11 is received within an annular recess formed on the outer circumference of the bush 15. In order to firmly attach the collar 13 onto the bush 15, the assembly is provided with a tension strip 14 which extends around the collar 13 and mounts the collar onto the bush 15.

The sealing bush 15 is provided at each end with an annular lip arranged in running contact with the shaft 9, with each lip acting as a dust seal. The sealing ring 17, which may be of any suitable material such as plastic or rubber, prevents ingress of contaminants such as water into the universal joint while also preventing escape of lubricant.

The first end of the sleeve 11 defined by the collar 12 is received by a correspondingly shaped region of a rigid annular shroud 10 which is affixed by any conventional means to a part of the outer joint member 1.

It will be appreciated that upon articulation of the shaft 9 with respect to the outer joint member 1, relative sliding movement of the bush 15 with respect to the shaft 9 will occur. Additionally, flexure of the boot 11 in a substantially radial direction relative to the axis of rotation of the joint will be permitted by the configuration of the boot. However, it should be further appreciated that substantially axial flexure of the boot 11 is not required and it is therefore possible to provide a boot incorporated within sealing means in accordance with the present invention by a simple design which may be manufactured in an economical and simple manner.

While a specific embodiment of the invention has been shown and described in detail to illustrate the application of the inventive principles, it will be understood that the invention may be embodied otherwise without departing from such principles.

What is claimed is:

1. A sealing assembly for a universal joint including an inner joint member, an outer joint member, torque transmission means interposed between said inner and outer joint members, said torque transmission means including rolling members received in grooves of said inner and outer joint members, and a drive shaft connected in driving engagement with one of said inner and outer joint members, said sealing assembly comprising: a sleeve having a first end with a larger diameter and a second end with a smaller diameter, said first end of said sleeve being connected to the other of said inner and outer members; an annular groove formed in said drive shaft; a bush arranged to concentrically surround said drive shaft with a uniform radial distance therebetween; a sealing ring arranged within said annular groove between said bush and said drive shaft, said annular groove with said sealing ring arranged therein being located within an operating range of said bush thereby mounting said bush to be axially movable relative to said drive shaft within said operating range, said sealing ring operating as a contact seal relative to the inner diameter of said bush; and attachment means affixing said second smaller diameter end of said sleeve to the outer circumference of said bush.

2. An assembly according to claim 1 wherein said second end of said sleeve is formed as a collar and wherein the outer circumference of said bush is formed with an annular recess within which said collar of said second end of said sleeve engages.

3. An assembly according to claim 1 wherein said attachment means comprise a connecting ring extending about said second end of said sleeve connecting said second end onto said bush.

* * * * *